US006237039B1

(12) United States Patent
Perlman

(10) Patent No.: US 6,237,039 B1
(45) Date of Patent: May 22, 2001

(54) METHOD AND APPARATUS FOR DOWNLOADING AUXILIARY DATA TO A CLIENT FROM A NETWORK DURING CLIENT IDLE PERIODS

(75) Inventor: Stephen G. Perlman, Mountain View, CA (US)

(73) Assignee: WebTV Networks, Inc., Moutain View, CA (US)

( * ) Notice: Subject to any disclaimer, the term of this patent is extended or adjusted under 35 U.S.C. 154(b) by 0 days.

(21) Appl. No.: 09/107,651

(22) Filed: Jun. 30, 1998

(51) Int. Cl.[7] ............... G06F 15/16; H04L 12/28
(52) U.S. Cl. ............ 709/237; 370/229; 709/202; 709/219; 709/224
(58) Field of Search ................. 709/202, 219, 709/224, 237; 370/229; 707/500

(56) References Cited

U.S. PATENT DOCUMENTS

| 5,737,619 | 4/1998 | Judson ........................... 395/761 |
| 5,796,952 | 8/1998 | Davis et al. ..................... 709/224 |
| 5,828,837 | 10/1998 | Eikeland ......................... 709/202 |
| 5,905,492 | 5/1999 | Straub et al. ................... 345/333 |
| 5,913,040 | 6/1999 | Rakavy et al. ................... 370/229 |
| 5,933,811 | 8/1999 | Angles et al. ................... 705/14 |
| 5,937,037 | 8/1999 | Kamel et al. ................... 397/88.19 |
| 5,948,061 | 9/1999 | Merriman ....................... 709/219 |
| 5,974,398 | 10/1999 | Hanson et al. .................. 705/14 |
| 5,978,381 | 11/1999 | Perlam et al. ................... 370/432 |
| 5,991,735 | 11/1999 | Gerace .......................... 705/10 |
| 6,009,410 | 12/1999 | LeMole et al. .................. 705/14 |
| 6,009,452 | 12/1999 | Horvitz ......................... 709/102 |
| 6,028,600 | 2/2000 | Rosin et al. .................... 345/327 |
| 6,047,327 | 4/2000 | Tso et al. ...................... 709/232 |

Primary Examiner—Zarni Maung
Assistant Examiner—Tammy Tak-kam Lee
(74) Attorney, Agent, or Firm—Workman, Nydegger & Seeley

(57) ABSTRACT

A method and apparatus for downloading auxiliary data to a client during idle periods and for displaying the auxiliary data while the client is fetching information from the network is disclosed. According to one embodiment of the present invention, the state of a client device is first determined, wherein the client device is in a fetching state while processing a user request and the user is waiting or in an idle state while not processing a user request and the user is not waiting for the client system. Auxiliary data is then downloaded from a server to the client device when the step of determining determines that the client device is in an idle state. Additionally, the downloaded auxiliary data is buffered in an auxiliary buffer. The auxiliary data is then processed to generate an output and the output is displayed on the client device while the client device is in a fetching state.

17 Claims, 5 Drawing Sheets

METHOD AND APPARATUS FOR DOWNLOADING AUXILIARY DATA TO A CLIENT FROM A NETWORK DURING CLIENT IDLE PERIODS

FIELD OF THE INVENTION

The present invention relates to the field of computer networking. Specifically, the present invention relates to the field of Internet technology.

DESCRIPTION OF RELATED ART

The Internet has greatly expanded the impact of computer networking on even the most unsophisticated computer users. The drastic growth of the World Wide Web ("the Web") has contributed greatly to this increased popularity of the Internet. The Web represents all of the computers on the Internet that offer users access to information on the Internet via interactive documents or "Web pages". These Web pages contain hypertext links that are used to connect any combination of graphics, audio, video and text, in a non-linear, non-sequential manner.

Users currently access information on the Internet over a wide variety of computer platforms, application software, and methods of network connectivity. Users with powerful workstations and high bandwidth network connections enjoy rapid response time when interacting with the computer network. These users may enter requests or commands to their client network browsers and expect near instantaneous responses from a server system coupled to the computer network. Other users, however, may not be connected to the computer network with such high bandwidth connections. For example, it is common for many network users to use a standard modem for connection to a network service provider. These modems can vary in bandwidth capability from relatively high bandwidth modems such as cable modems or Integrated Services Digital Network (ISDN) modems, to relatively slow modems operating in the 19.2Kbits or 28.8Kbits per second range. Although adequate for small data transfers, the transfer of large blocks of data such as digitized images common on the Web, can produce significant response time delays with low bandwidth modems or other low bandwidth network connection devices.

Thus, it is common for users, particularly those operating on the Web, to wait for a few seconds or even a few minutes while information is downloaded from a server to the client computer system across the network. While the user is waiting for the download, he or she is essentially a "captive audience", but prior art systems do not take advantage of this situation in any meaningful manner. If, for example, the waiting period could be utilized to display advertisements or other such auxiliary information, this wait time would become a valuable source of revenue for Internet content providers who would be able to charge a premium rate for the advertisements. Given that advertising revenues on the Internet are increasing drastically as advertisers move from the traditional advertising mediums, such as television and radio, to the Internet, any additional advertising time that can be made available on the Internet is clearly a highly valuable commodity.

SUMMARY OF THE INVENTION

The present invention is a method and apparatus for downloading auxiliary data to a client during idle periods and for displaying the auxiliary data while the client is fetching information from the network. According to one embodiment of the present invention, the state of a client device is first determined, wherein the client device is in a fetching state while processing a user request and the user is waiting or in an idle state while not processing a user request and the user is not waiting for the client system. Auxiliary data is then downloaded from a server to the client device when the step of determining determines that the client device is in an idle state. Additionally, the downloaded auxiliary data is buffered in an auxiliary buffer. The auxiliary data is then processed to generate an output and the output is displayed on the client device while the client device is in a fetching state.

Other features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention relates to a method and apparatus for downloading auxiliary data to a client during idle periods and for displaying the auxiliary data while the client is fetching information from the network. "Auxiliary data" as used in the context of this application includes text, graphics, and/or audio, video, and/or multimedia displays such as advertisements, informative messages or audio, or other information of interest to a networked computer user. It will, however, be apparent to one of ordinary skill in the art that other types of auxiliary data may also be downloaded and displayed according to the embodiments of the present invention. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1A:
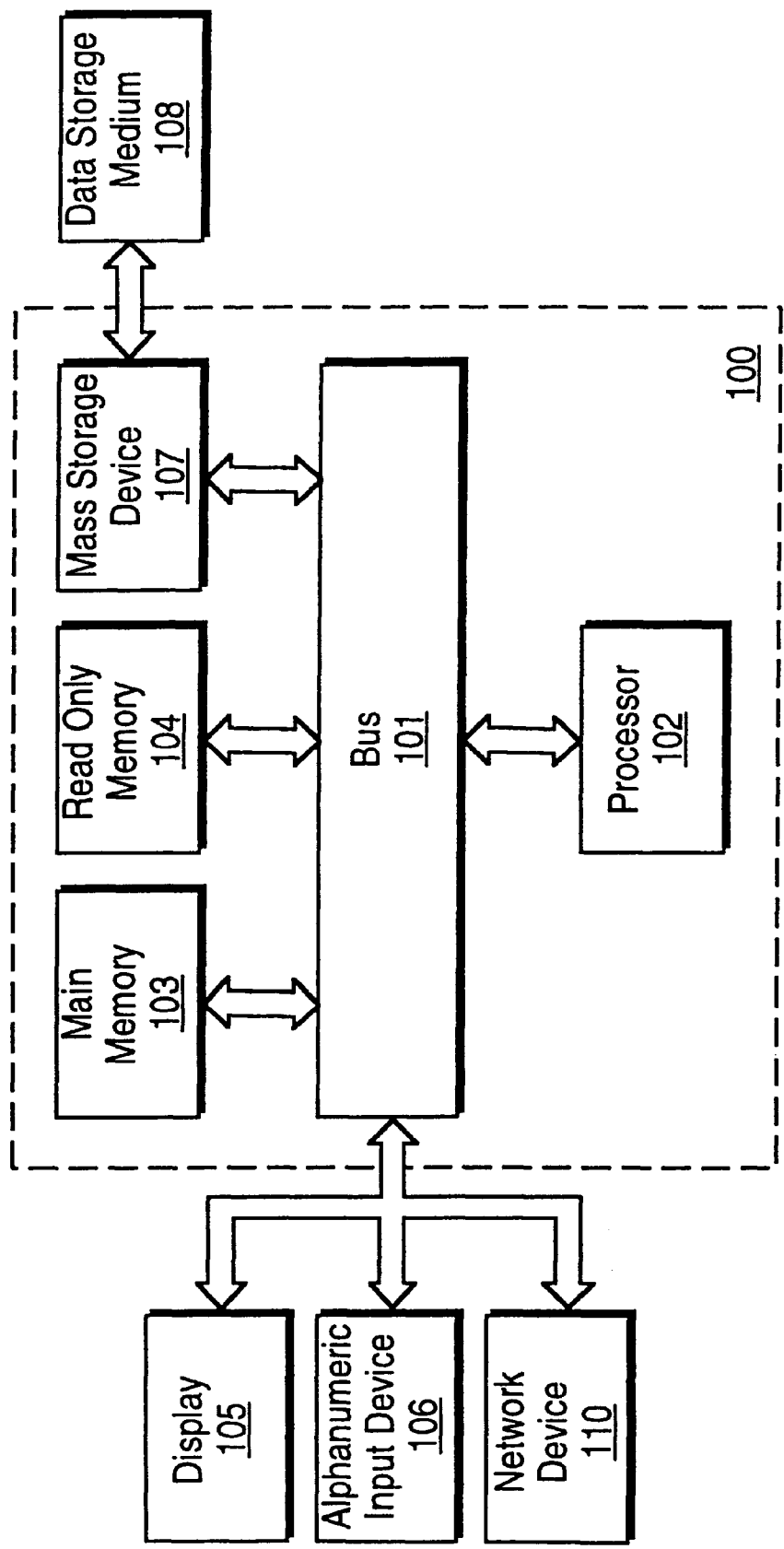
FIGS. 1A and 1B illustrate typical computer system architectures in which the present invention operates.

FIG. 1A illustrates a typical computer system 100 architecture in which the present invention operates. An embodiment of the present invention is implemented on a personal computer such as ones manufactured by IBM Corporation of Armonk, N.Y. It will be apparent to those of ordinary skill in the art, however, that alternative computer system architectures may be employed. In general, such computer systems as illustrated by FIG. 1A comprise a bus 101 for communicating information, a processor 102 coupled with the bus 101 for processing information, main memory 103 coupled with the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with data storage device 107 to allow processor 102 access to the digital information on data storage medium 108 via bus 101. In addition, a CD-ROM drive (not shown) may also be used for the storage of high resolution images for display on the display device 105.

Processor 102 may be any of a wide variety of general purpose processors or microprocessors such as the PENTIUM™ brand microprocessor manufactured by Intel™ Corporation or the SPARC™ brand processor manufactured by Sun Microsystems™. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, or other magnetic or optical data storage device for reading and writing information stored on a hard disk, a floppy disk, a magnetic tape, or other magnetic or optical data storage medium.

In general, processor 102 retrieves processing instructions and data from a data storage medium 108 using data storage device 107 and downloads this information into random access memory 103 for execution. Processor 102, then executes an instruction stream from random access memory 103 or read-only memory 104. Command selections and information input at alphanumeric input device 106 are used to direct the flow of instructions executed by processor 102. The input device 106 may be an alphanumeric keyboard, a remote control device, or an alphanumeric keyboard, remote control device, or a pointing device such as a conventional mouse or trackball device. The results of this processing execution are then displayed on display device 105.

Another embodiment of the present invention is implemented on an Internet system such as the WEBTV™, brand Internet system developed by WebTV Networks™, Inc., of Palo Alto, Calif. The Internet system includes a standard television set as a display device for browsing the World Wide Web and connects to a conventional network, such as the Internet, using standard telephone, ISDN, or a similar network communication coupling. Further details of the Internet system, including the Internet system client can be found in co-pending U.S. patent application entitled, "Web Browser Allowing Navigation Between Hypertext Objects Using Remote Control", having application Ser. No. 08/660, 088, and filed on Jun. 3, 1996.

A user of an Internet system client can utilize Internet services provided by one or more remote Internet servers. The Internet services can be used in conjunction with software running in an Internet system client to browse the Web, send electronic mail, and to make use of the Internet in various other ways. The Internet uses a HyperText Transport Protocol (HTTP) based set of protocols implemented within the Web and supported by one or more Web servers.

Figure 1B:
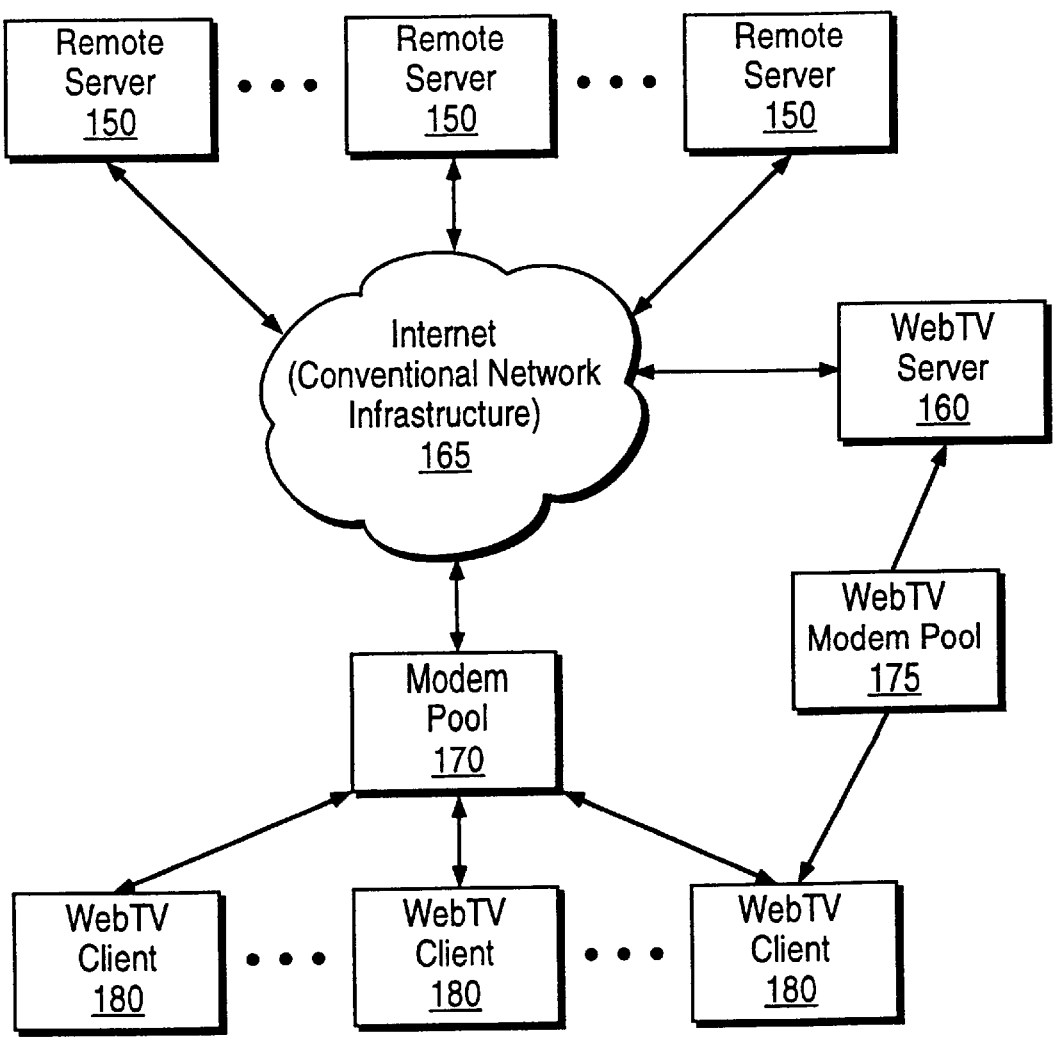

FIG. 1B illustrates a basic configuration of the Internet according to one embodiment. A number of Internet system clients 180 are coupled to a modem pool 170 via direct-dial, bi-directional data connections, which may be telephone (POTS, i.e., "plain old telephone service"), ISDN (Integrated Services Digital Network), or any other similar type of connection. Modem pool 170 is coupled typically through a router, such as that conventionally known in the art, to a number of remote servers 150 via a conventional network infrastructure 165, such as the Internet.

The Internet system also includes an Internet server 160, which specifically supports the Internet system clients 180. Internet system server 160 acts as a proxy in providing the Internet system client 180 with access to the Web and other Internet system services. More specifically, Internet system server 160 functions as a "caching proxy". A proxy cache on Internet system server 160 is used for temporary storage of Web documents, images, and other information which is used by frequently either the Internet system client 180 or the Internet system server 160. Internet system clients 180 each have a connection to the Internet system server 160 either directly or through the conventional modem pool 170 and the Internet 165. Note that the modem pool 170 is a conventional modem pool, such as those found today throughout the world providing access to the Internet and private networks.

One embodiment of the present invention is implemented as a software module, which may be executed on a computer system such as computer system 100 or Internet system client 180 in a conventional manner. Using well known techniques, the application software of the preferred embodiment is stored on data storage medium 108 and subsequently loaded into and executed within computer system 100 or Internet system client 180. Once initiated, the software of this embodiment operates in the manner described below.

According to one embodiment of the present invention, there are three basic states in which the Internet client may operate. These three states are, 1) Responding, 2) Fetching, or 3) Idle. In the Responding state, the Internet system client user has issued a request or activated a function in the Internet system client and the user is not waiting for the results of the request or function to be rendered by the Internet system client. This state is active, for example, when a user is editing a document or manipulating a local file. The Responding state includes situations when the user has issued a request or activated a function for which some delay in user response is expected; however, the delay is less than a pre-determined time period (e.g. a few seconds).

In contrast to the Responding state, the Fetching state is active when the user has issued a request or activated a function for which a more substantial delay in user response is expected. In this state, the user must wait until the request or function is completed. Typically, the delay is greater than or equal to a predetermined time period (e.g. more than a few seconds). The Responding state is common when browsing the Web. In conventional systems, a user requests a Web page on the Web and thereafter must wait for the Web page to be fetched, delivered, and displayed on the Internet system client. Sometimes, this fetch process may cause a substantial delay in the user's ability to use the Internet system client. While the user is waiting for his/her request to be serviced, the user is often presented with a display screen full of old information upon which an hourglass icon, for example, is overlaid indicating a user request is in progress.

The third basic state is the Idle state. In the Idle state, the Internet system client is not responding to a user request or a user-activated function and the user is not waiting for the Internet system client to complete a task. In this state, the Internet system client is waiting for user input. In conventional software systems, it is common for a software application to have an idle loop which is executed when all other user and system task have been completed.

These three basic Internet system client states are mutually exclusive in the preferred embodiment of the present invention. As will be described below, the present invention performs additional processing when the client is in the Idle and the Fetching states. In the Responding state, the client is already busy and thus no additional processing by the present invention is required.

When the Internet system client is in the Idle state, auxiliary data may be downloaded to the Internet system client. In one embodiment, the auxiliary data transfer to the client begins immediately upon transitioning to the Idle state. In another embodiment, the auxiliary data transfer to the client begins after a predetermined delay period once the client transitions to the Idle state. In another embodiment, the auxiliary data transfer may be suppressed if a sufficient amount of auxiliary data has previously been transferred, if there is no storage space available for the auxiliary data, or if the user has selectively disabled the transfer of auxiliary data. In any of these embodiments, the auxiliary data is transferred while the Internet system client is not otherwise involved in servicing a user request or executing a user or system task. In this manner, the auxiliary data transfer occurs transparently to the user and the user is not impacted by the transfer.

The presence of the Idle state may be determined in a number of ways, such as when there has been no input to the client in a specified amount of time or where the processing load of the client falls below a predetermined threshold. An Idle state may occur, for example, when the user is not providing input to the client machine temporarily or when the user is performing tasks that require minimal amounts of client processing. Once the auxiliary data is downloaded onto the Internet system client during this Idle period, the data is buffered. The buffered data is then available to be displayed by the client at a later time when the client is in the Fetching state. In the Fetching state, the client is actively processing a request and the user is unable to do anything else on the client until the client completes its tasks.

Figure 2A:
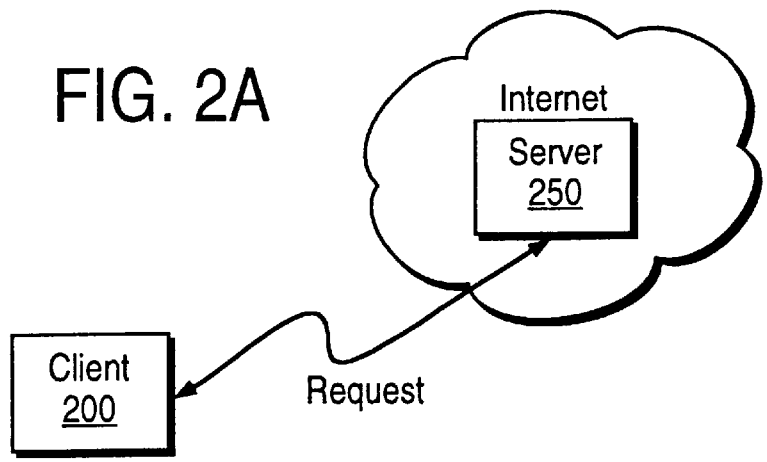
FIGS. 2A and 2B illustrate how auxiliary data is downloaded during a client idle period according to one aspect of the present invention.
Figure 2B:
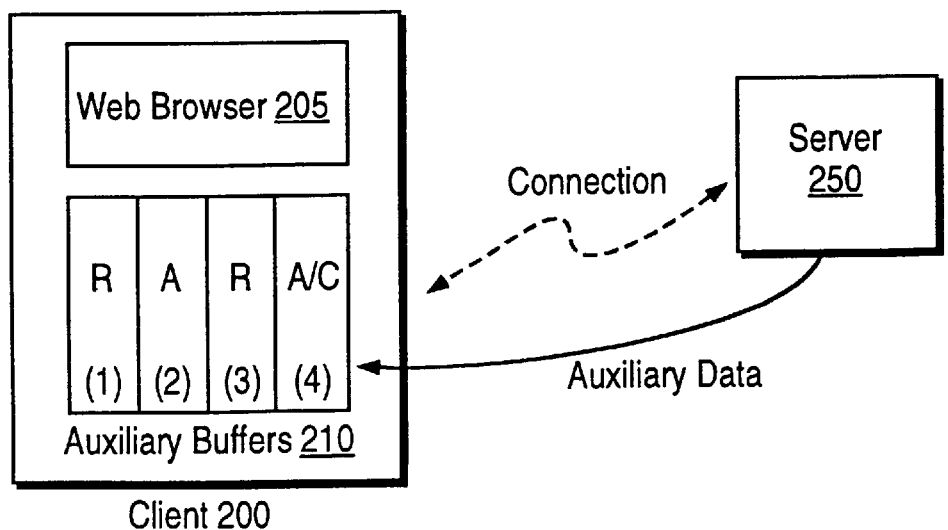

FIGS. 2A and 2B illustrate how auxiliary data is downloaded during a client Idle period according to one aspect of the present invention. In FIG. 2A, client 200 requests data from server 250 on the Internet, for example. Client 200 may be a computer system such as the one shown in FIG. 1A or client 180 as shown in FIG. 1B. Server 250 may be a computer system such as the system illustrated in FIG. 1A or remote server 160 in FIG. 1B. In FIG. 2B, client 200 is idle and is not downloading data from server 250 or actively performing other tasks. If, for example, a Universal Resource Locator (URL) is specified by a user, client 200 transitions to the Fetching state and Web browser 205 begins to download information from the document specified in the URL. While the document is being downloaded, client 200 is still in the Fetching state and typically unable to process other user requests. In prior art systems, the user has little to do while client 200 is fetching but to wait for the fetch to be completed.

According to one embodiment of the present invention, client 200 is examined to determine whether it is in a fetching state or an idle state. As described above, the Fetching state is active when the user has issued a request or activated a function for which a more substantial delay in user response is expected. In this state, the user must wait until the request or function is completed. In the Idle state, the Internet system client is not responding to a user request or a user-activated function and the user is not waiting for the Internet system client to complete a task.

If, as in FIG. 2B, client 200 is idle, client 200 will automatically begin to download auxiliary data from server 250 to client 200. The downloaded auxiliary data is buffered in auxiliary buffers 210 on client 200.

As shown in FIG. 2B, according to one embodiment of the present invention, the auxiliary buffers 210 are marked as available (A), ready to display (R) or current (C). Before any auxiliary data is downloaded, all buffers are marked A. When client 200 is ready to download auxiliary data, client 200 examines auxiliary buffers 210 and selects one of the buffers marked "available" (A) and sets the selected buffer to the "current" buffer, C. Client 200 then downloads the auxiliary data from server 250 into buffer C. After all the auxiliary data is downloaded, the status of the buffer marked C is re-set to a "ready to display" status, R. As illustrated, auxiliary data is being downloaded to auxiliary buffer 210 (1), initially marked A, then set to C. At the end of the download, auxiliary buffer 210(1) will be marked to R. According to one embodiment of the present invention, the oldest buffer marked ready to display will be processed and output first. Other methods of detecting which of two or more R status buffers should be output may be employed. Once output, the buffer will then be marked as re-set to A for "available" and can be used during the next client idle period to store newly downloaded auxiliary information.

If at any point during this downloading of auxiliary data the user begins to actively use client 200, the downloading activity will cease and the user's commands will be processed. The user thus does not notice any latency due to the downloading activity occuring during the client idle period. The downloading may resume or restart at a later time, if client 200 once again transitions to an idle state. In one embodiment, the download of a buffer can resume at the point at which it was interrupted by user input. In another embodiment, the transfer of a partially downloaded buffer can be restarted after an interruption due to user input. According to this embodiment, therefore, client 200 is effectively utilized during idle periods without affecting the user's ability to operate the client 200 when desired.

Figure 3:
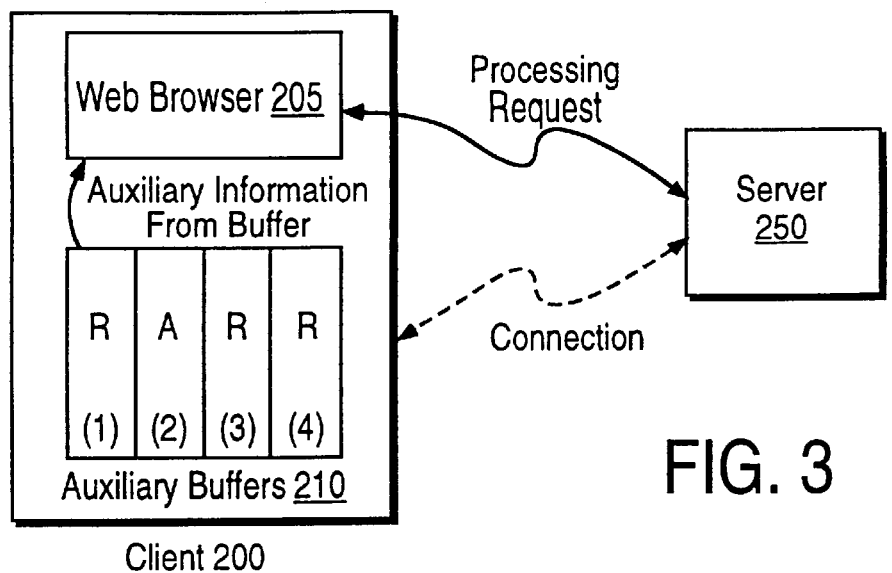
FIG. 3 illustrates how the buffered auxiliary data is used while a client is processing a request.

FIG. 3 illustrates how the buffered auxiliary data is used while a client is processing a request in a Fetching state. If client 200 is actively downloading data from server 250 and the user is waiting for the download to be completed, as illustrated in FIG. 3, the user will be a "captive audience" while waiting for the request processing to complete. As illustrated in FIG. 3, according to one embodiment of the present invention, data from auxiliary buffers 210 will be processed by Web browser 205 during this Fetching state of client 200. The output is then displayed by Web browser 205.

This display of auxiliary information thus takes place while client 200 is busy downloading information from server 250 and the user cannot perform other tasks on client 200 (i.e. the Fetching state). The result is that while client 200 is waiting for requested information to be downloaded, the user may be presented with previously downloaded auxiliary information, such as advertisements. Although prior art systems may display information during this waiting period, the information in the prior art systems is stored on the network, generally on the servers. Thus, in the prior art systems, the display of auxiliary information itself may slow down the downloading of the requested information because the auxiliary information also has to be downloaded. According to the presently claimed invention, however, the auxiliary data is buffered on the client and as such, the processing and display of the auxiliary information does not affect the download of requested data nor the user response time.

According to another embodiment of the present invention, client 200 may be set to "time out" or disconnect from the network if there is no activity for a predetermined amount of time. If so, client 200 first downloads auxiliary data as described above. Then, having downloaded as much auxiliary data as desired, client 200 may disconnect from the network and begin to display the auxiliary data from buffers 210. According to this embodiment, therefore, the user of client 200 may be presented with auxiliary data even when client 200 is not connected to the network and is not actively processing a request.

Figure 4:
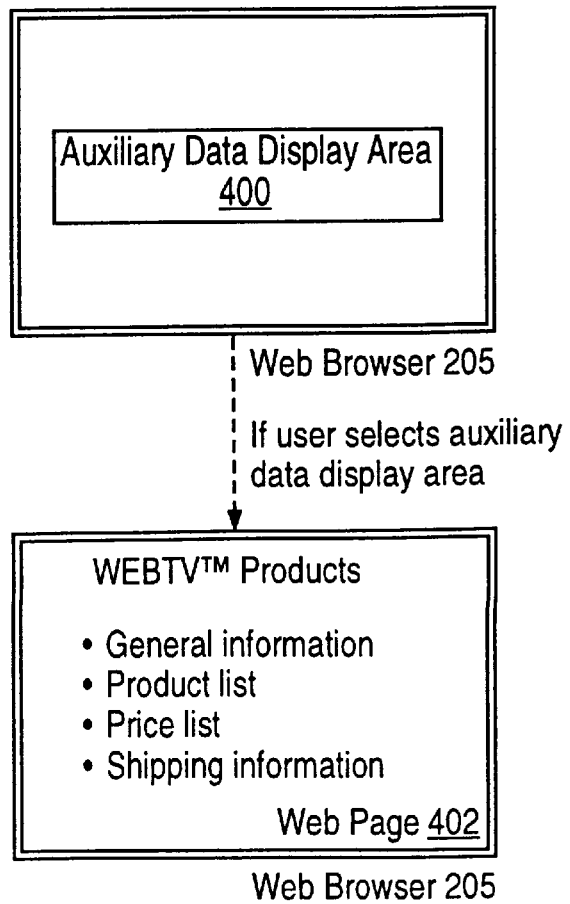
FIG. 4 illustrates a user selecting an auxiliary information display area and automatically jumping to the web page that is linked to the advertisement in the auxiliary information display area.

In any embodiment described above, while auxiliary information is being displayed on client 200, the user may select the auxiliary information display area to activate the auxiliary information and be presented with related information. For example, as illustrated in FIG. 4, if the auxiliary information that is being displayed in auxiliary information display area 400 is an advertisement for Internet system products, foe example, if the user selects auxiliary information display area 400, the user will automatically jump to a related Web page 402 that is linked to that particular advertisement. Although the auxiliary information display area 400 is illustrated as covering only a portion of the Web browser screen, it will be apparent to one of ordinary skill in the art that the auxiliary information display area 400 may be of any size without affecting the functionality of the presently claimed invention.

Additionally, according to one embodiment of the present invention, the auxiliary information that is displayed is "context sensitive," namely the auxiliary information that is displayed is related to the most recently accessed documents. In the example illustrated in FIG. 4, the user may initially be browsing Web pages pertaining to Web related product technology. If so, the types of advertisements that would be displayed while the user is waiting to get from one location to another will pertain to Web related product technologies, such as a particular Internet system. If, on the other hand, the user had originally been browsing a Web site with movie listings or theatrical productions, the advertisement that would be displayed would pertain to movies or theatrical productions.

In the event there are no advertisements for a particular type of Web page, the client may be configured to randomly select an advertisement, select an advertisement for a closely related area, or suppress the advertisement altogether. The downloaded advertisements themselves may also be "tagged" to be shown or suppressed at certain times or when the user is browsing a particular type of Web page. In this manner, advertisers or suppliers of other types of auxiliary data will be able to maintain a reasonable amount of control over when their information is displayed, comparable to other traditional forms of advertising.

Figure 5:
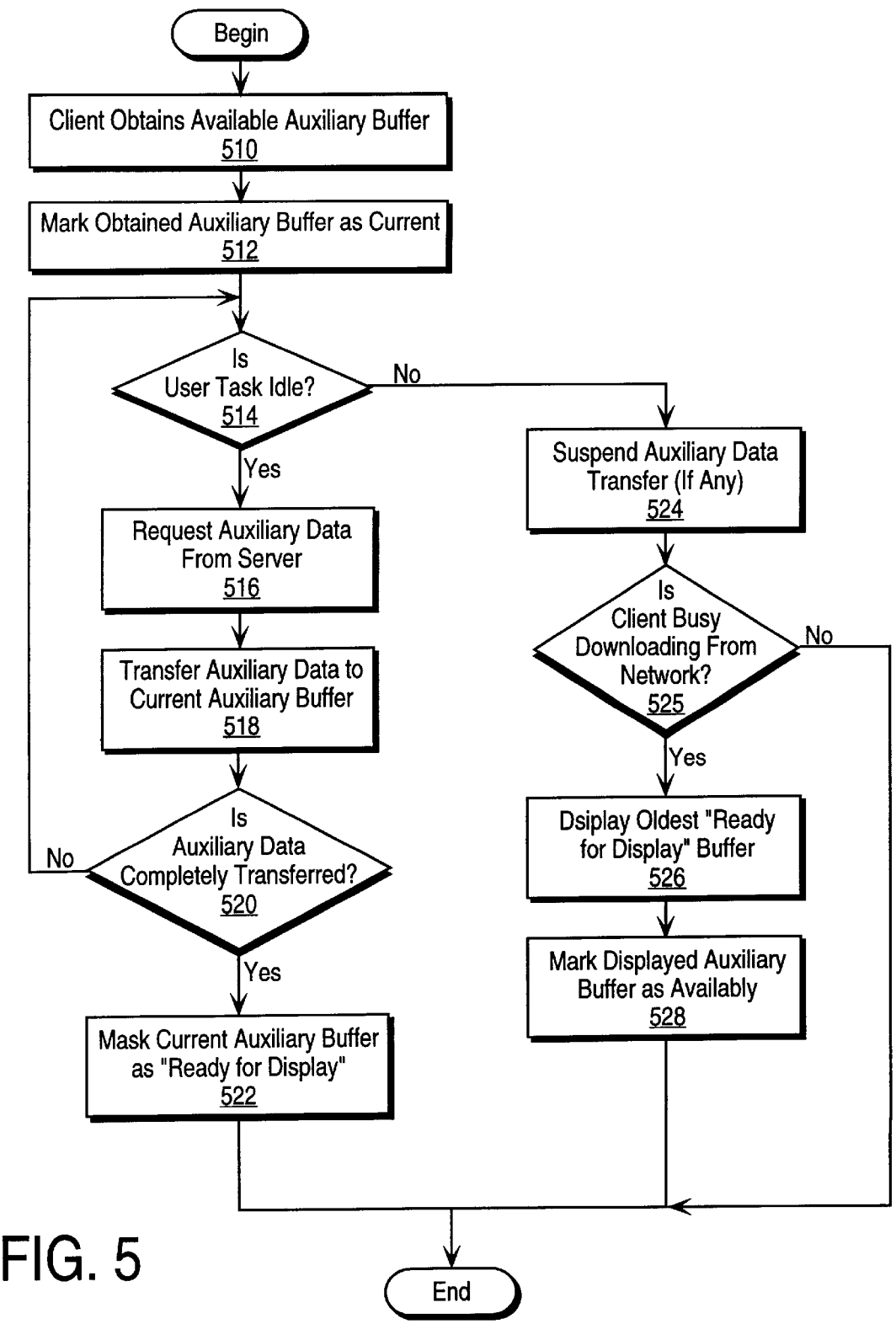
FIG. 5 is a flow chart illustrating one embodiment of the present invention.

FIG. 5 is a flow chart illustrating the embodiment of the present invention. According to this embodiment, client 200 will obtain a next available auxiliary buffer in step 510, and mark the obtained buffer as "current" in step 512. In step 514, the state of the Internet system client is tested to determine whether the client is in an Idle state or in a Fetching state. If the client is idle, client 200 requests auxiliary data from the server in step 516. The auxiliary data is transferred to the current auxiliary buffer on client 200 at step 518. At step 520, client 200 examines the auxiliary data to determine whether the data was completely transferred. If the auxiliary data was not completely transferred, according to step 518, client 200 will once again examine the client to determine if the client is idle and repeat steps 514 through 520 if the client is idle. If the auxiliary data is completely transferred, then in step 522, the current auxiliary buffer is marked as ready for display.

If at step 514 the Internet system client is not in an Idle state, then in step 524 auxiliary data transfer (if any) will be suspended. If the client is in a Fetching state and therefore busy downloading data from the network (decision block 525), data in the oldest "ready for display" auxiliary buffer will be processed and the output will be displayed according to step 526. In step 528, the displayed auxiliary buffer will be marked as "available". This auxiliary buffer is then available when steps 514 through 520 are performed again. If, as tested in block 525, the client is not in a Fetching state or the Idle state (i.e. client is in the Responding state), processing terminates through the "No" branch without displaying data from an auxiliary buffer and without transferring auxiliary data to the client.

Thus, a method and apparatus for downloading auxiliary data to a client during idle periods and for displaying the auxiliary data while the client is fetching information from the network is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for a client device to automatically download auxiliary data from a server on a network for display on said client device during a period of latency associated with a fetching state of the client device, said computer-implemented method comprising the steps of:

examining activity of said client device, as opposed to monitoring communication activity of a network connection associated with said client device, to identify a state of said client device wherein said client device is capable of being in any of a fetching state, an idle state, and a responding state;

upon examining activity of said client device, determining that said client device is currently in said idle state;

in response to determining that said client device is in said idle state, automatically downloading said auxiliary data from said server to said client device;

examining activity of said client device and determining that said client device is currently in said fetching state; and in response to determining that said client device is in said fetching state, displaying said auxiliary data on said client device during a period of latency associated with said fetching state.

2. The computer-implemented method according to claim 1 further including the step of:

buffering said downloaded auxiliary data in an auxiliary buffer on said client device.

3. The computer-implemented method according to claim 2, wherein the step of displaying said auxiliary data on said client device comprises the steps of:

processing said downloaded auxiliary data in said auxiliary buffer to generate an output; and displaying said output on said client device, said output representing said auxiliary data.

4. The computer-implemented method according to claim 2 wherein said step of buffering said auxiliary data further includes the steps of:

marking said auxiliary buffer as current;

inserting said downloaded auxiliary data into said auxiliary buffer; and marking said auxiliary buffer as ready.

5. The computer-implemented method according to claim 2 wherein said auxiliary data is advertising data.

6. The computer-implemented method according to claim 5 wherein said step of displaying said auxiliary data includes the step of selecting context sensitive advertising data from said auxiliary data and displaying said context sensitive advertising data.

7. The computer-implemented method according to claim 2 wherein said step of displaying said auxiliary data includes the step of selecting context sensitive auxiliary data to display.

8. A method as recited in claim 1, wherein said auxiliary data comprises advertising data, such that the step of displaying said auxiliary data on said client device comprises the step of displaying said advertising data on said client device.

9. A computer-implemented method for a client device to automatically download auxiliary data from a server on a network for display on said client device during a period of latency associated with a fetching state of the client device, said computer implemented method comprising the steps of:

examining activity of said client device, wherein said client device is capable of being in any of a fetching state, an idle state, and a responding state, and determining that said client device is currently in said idle state;

automatically downloading said auxiliary data from said server to said client device in response to determining that said client device is in said idle state;

buffering said downloaded auxiliary data in an auxiliary buffer;

determining that said client device is currently in said fetching state;

processing said auxiliary data in said auxiliary buffer to generate an output while said client device is in said fetching state; and displaying said output on said client device during a period of latency associated with said fetching state.

10. The computer-implemented method according to claim 9 wherein said step of buffering said auxiliary data further includes the steps of:

marking said auxiliary buffer as current;

inserting said downloaded auxiliary data into said auxiliary buffer; and marking said auxiliary buffer as ready to display.

11. The computer-implemented method according to claim 10 wherein said client device includes a plurality of auxiliary buffers, one of which being said auxiliary buffer into which said auxiliary data has been inserted, said step of processing said auxiliary data in said auxiliary buffer to generate said output includes the steps of:

recognizing that said auxiliary buffer into which said downloaded auxiliary data has been inserted has been marked as ready to display; and in response to the step of recognizing, selecting said auxiliary buffer into which said auxiliary data has been inserted from among said plurality of auxiliary buffers.

12. The computer-implemented method according to claim 9 wherein said step of displaying said output on said client device during a period of latency associated with said fetching state continues after said client device is disconnected from said network.

13. A computer program product for implementing, in a client device included in a network that also includes a server, a method for said client device to automatically download auxiliary data from said server for display on said client device during a period of latency associated with a fetching state of the client device, said computer program product comprising:

a computer-readable medium carrying computer-executable instructions for implementing the method, said computer-executable instructions being capable of placing the client device in any of a fetching state, an idle state, and a responding state with respect to data transmitted to the client device from the server, said computer-executable instructions, when executed by said client device, performing the steps of:

examining activity of said client device, as opposed to monitoring communication activity of a network connection associated with said client device, to identify the state of said client device;

upon examining activity of said client device, determining that said client device is currently in said idle state;

in response to determining that said client device is in said idle state, automatically downloading said auxiliary data from said server to said client device;

examining activity of said client device and determining that said client device is currently in said fetching state; and in response to determining that said client device is in said fetching state, displaying said auxiliary data on said client device during a period of latency associated with said fetching state.

14. A computer program product as recited in claim 13, wherein said auxiliary data includes advertising data, such that said client device displays said advertising data when said client device is in said fetching state.

15. A computer program product as recited in claim 13, wherein:

said client device includes a plurality of auxiliary buffers into which auxiliary data can be buffered; and said computer-executable instructions, when executed by said client device, further perform the step of marking each of said plurality of auxiliary buffers, wherein each of said auxiliary buffers can be marked as being either available, ready to display, or current.

16. A computer program product as recited in claim 15, wherein the step of automatically downloading said auxiliary data from said server to said client device comprises the step of buffering said auxiliary data into a buffer that is marked as being available.

17. A computer program product as recited in claim 15, wherein the step of displaying said auxiliary data on said client device comprises the step of obtaining said auxiliary data from a buffer that is marked as being ready to display.

* * * * *

UNITED STATES PATENT AND TRADEMARK OFFICE
CERTIFICATE OF CORRECTION

PATENT NO. : 6,237,039 B1
DATED : May 22, 2001
INVENTOR(S) : Stephen G. Perlman

It is certified that error appears in the above-identified patent and that said Letters Patent is hereby corrected as shown below:

Title page,
Under U.S. PATENT DOCUMENTS, after "5,978,381" change "Perlam et al." to -- Perlman, et al. --

Column 7,
Line 27, change "foe" to -- for --

Signed and Sealed this

Twelfth Day of March, 2002

*Attest:*

*Attesting Officer*

JAMES E. ROGAN
*Director of the United States Patent and Trademark Office*